(No Model.)

L. D. WARNER.
NUT LOCK.

No. 355,286. Patented Dec. 28, 1886.

WITNESSES

Lorenzo D. Warner
INVENTOR

Attorney

UNITED STATES PATENT OFFICE.

LORENZO DOW WARNER, OF ELKHART, INDIANA, ASSIGNOR OF ONE-HALF TO CARLTON SAGE, OF SAME PLACE.

NUT-LOCK.

SPECIFICATION forming part of Letters Patent No. 355,286, dated December 28, 1886.

Application filed May 13, 1886. Serial No. 202,082. (No model.)

*To all whom it may concern:*

Be it known that I, LORENZO DOW WARNER, a citizen of the United States of America, residing at Elkhart, in the county of Elkhart and State of Indiana, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in nut-locks, the object of the same being to provide a simple and effective device whereby a nut may be secured upon a bolt, so that it will not rotate upon the same; and to this end my invention consists in the construction and combination of the parts, as will be hereinafter fully set forth, and specifically pointed out in the claims.

Figure 1:
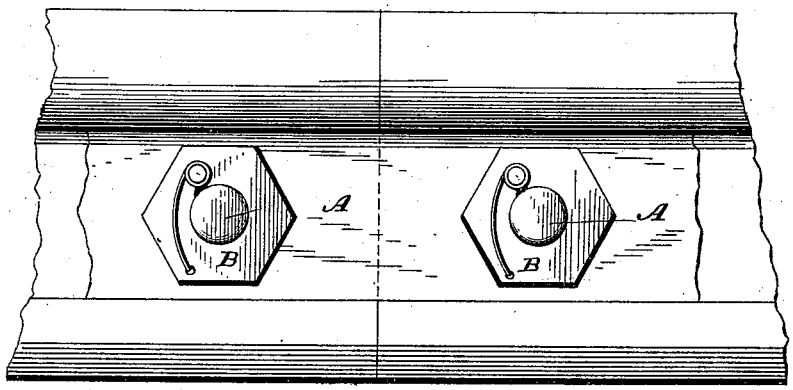
Figure 2:
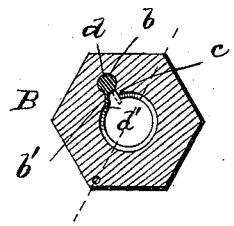
Figure 3:
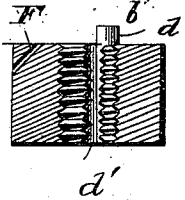
Figure 5:
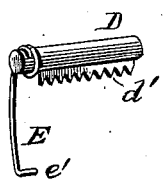
Figure 4:
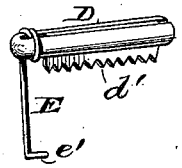
Figure 6:

In the accompanying drawings, which illustrate my invention, Figure 1 is a side view of my improved lock-nut, showing the same applied to a fish-plate of a railroad-rail. Fig. 2 is a sectional view. Fig. 3 is a sectional view through the line $x\ x$ of Fig. 2, and Figs. 4, 5, and 6 are detail views of the locking-bolt.

A refers to the bolt, which is of ordinary construction, and is provided at one end with the usual screw-threads, which engage with the female threads of the nut B. This nut is provided adjacent to its screw-threaded portion with an opening, $b$, which intersects the screw-threads of the nut, and adjacent to the screw-threads this opening has an inclined side, $b'$, while the opposite side, $c$, has a straight edge. Adjacent to these edges is a circular opening, $d$, within which will lie a bar, D, which has rigidly attached thereto a notched or threaded plate, $d'$, the notches thereof corresponding with the threads of the nut. It will be seen by this construction with the bar D, which lies within the opening $d$ in the nut and carries the threaded plate $d'$, when turned in one direction or to such a position that the plate $d'$ will lie against the inclined edge $b'$ of the opening, that the nut may be readily screwed or unscrewed from the bolt, and that the plate will not engage so as to prevent the rotation of the nut upon the bolt. When the nut is turned in the direction to unscrew the same, the teeth of the plate will engage with the body of the bolt between the threads of the bolt, and will prevent the bar D being removed from the nut. The bar D is preferably made up of a single piece of semicircular metal, which is bent upon itself so as to provide a central place, within which will lie the plate $d'$. By thus bending the bar I also provide an opening at its upper end, $e$, within which the end of a spring, E, may be secured, said spring being coiled around or otherwise attached to the upper end of the bar, and from thence lies a sufficient distance over the face of the nut, so that its bent end $e'$ will enter the perforation or opening F in the edge of the nut, said perforation extending from the face of said nut to one side, as fully shown in Fig. 3. The spring E, when placed in the perforation F, will have a tendency to turn the bolt D, so that the serrated plate attached thereto will be thrown against the straight side $c$ of the opening in which it is placed, thus causing said plate to bite upon the body between the threads of the bolt, so as to prevent the same being unscrewed.

It will be noted that all the parts of my improvement coact, and that the plate which is carried by the bolt D not only serves to prevent said nut being unscrewed, but also holds the bolt in place, and that the spring serves a double purpose—first, of throwing the plate in engagement with the teeth, and also as a handle or grasping means for the bolt D, so that the serrated plate thereof can be thrown to one side when it is desired to remove the nut from the screw-threaded bolt.

I claim—

1. In a nut-lock, the combination, with a threaded bolt, of a nut having a recess parallel and adjacent to its threaded portion, a bolt, D, carrying a plate, $d'$, and a spring secured to said bolt and adapted to engage a perforation in the nut, substantially as shown, and for the purpose set forth.

2. In combination with a bolt, A, a nut, B, having an opening adjacent to its screw-threaded portion, said opening having a straight and an inclined edge, a bolt, D, having a serrated plate, $d'$, attached thereto, said plate engaging with the bottom of the threads of the bolt A, substantially as shown, and for the purpose set forth.

3. In combination with a bolt, A, a nut, B, having a recess bisecting the screw-threads thereof for the reception of a bolt, D, said bolt having a serrated plate, $d'$, and a spring, E, having a bent end, which engages with a perforation in the face of the nut, substantially as shown, and for the purpose set forth.

In testimony whereof I affix my signature in presence of two witnesses.

LORENZO DOW WARNER.

Witnesses:
CHARLES S. HENDERSON,
JOSEPH P. FARRAND.